United States Patent
Kossentini et al.

(10) Patent No.: US 12,526,419 B2
(45) Date of Patent: Jan. 13, 2026

(54) BIT-RATE-BASED HYBRID ENCODING ON VIDEO HARDWARE ASSISTED CENTRAL PROCESSING UNITS

(71) Applicant: Intel Corporation, Santa Clara, CA (US)

(72) Inventors: Faouzi Kossentini, Mission (CA); Colton Cheung, Vancouver (CA); Chanpreet Mann, Surrey (CA); Chekib Nouira, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 17/948,204

(22) Filed: Sep. 19, 2022

(65) Prior Publication Data
US 2023/0010681 A1     Jan. 12, 2023

Related U.S. Application Data

(60) Provisional application No. 63/357,749, filed on Jul. 1, 2022.

(51) Int. Cl.
*H04N 7/12* (2006.01)
*H04N 19/124* (2014.01)
*H04N 19/127* (2014.01)
*H04N 19/136* (2014.01)
*H04N 19/42* (2014.01)

(52) U.S. Cl.
CPC ......... *H04N 19/127* (2014.11); *H04N 19/124* (2014.11); *H04N 19/136* (2014.11); *H04N 19/42* (2014.11)

(58) Field of Classification Search
CPC ..................................................... H04N 19/149
See application file for complete search history.

(56) References Cited

U.S. PATENT DOCUMENTS

2002/0150157 A1* 10/2002 Lin ................. H04N 19/122
375/E7.176

* cited by examiner

*Primary Examiner* — Y Lee
(74) *Attorney, Agent, or Firm* — Hanley, Flight & Zimmerman, LLC

(57) ABSTRACT

This disclosure describes systems, methods, and devices related to bit-rate-based hybrid encoding. A device may generate a list of encodes based on pairs of resolution and quantization parameters (QP) pairs associated with one or more video segments received from a source. The device may generate an estimated bit rate associated with the one or more video segments based on an analysis of the one or more video segments. The device may compare the estimated bit rate to a threshold. The device may switch between a software encoder and a hardware encoder based on the comparison of the estimated bit rate to the threshold. The device may encode each of the one or more video segments for transmission using the hardware encoder or the software encoder.

20 Claims, 5 Drawing Sheets

BIT-RATE-BASED HYBRID ENCODING ON VIDEO HARDWARE ASSISTED CENTRAL PROCESSING UNITS

CROSS-REFERENCE TO RELATED APPLICATION(S)

This application claims the benefit of U.S. Provisional Application No. 63/357,749, filed Jul. 1, 2022, the disclosure of which is incorporated herein by reference as if set forth in full.

TECHNICAL FIELD

This disclosure generally relates to systems and methods for wireless communications and, more particularly, to bit-rate-based hybrid encoding on video-hardware-assisted central processing units (CPUs).

BACKGROUND

Video coding can be a lossy process that sometimes results in reduced quality when compared to the source video. Video coding standards are being developed to improve video quality.

Figure 1:
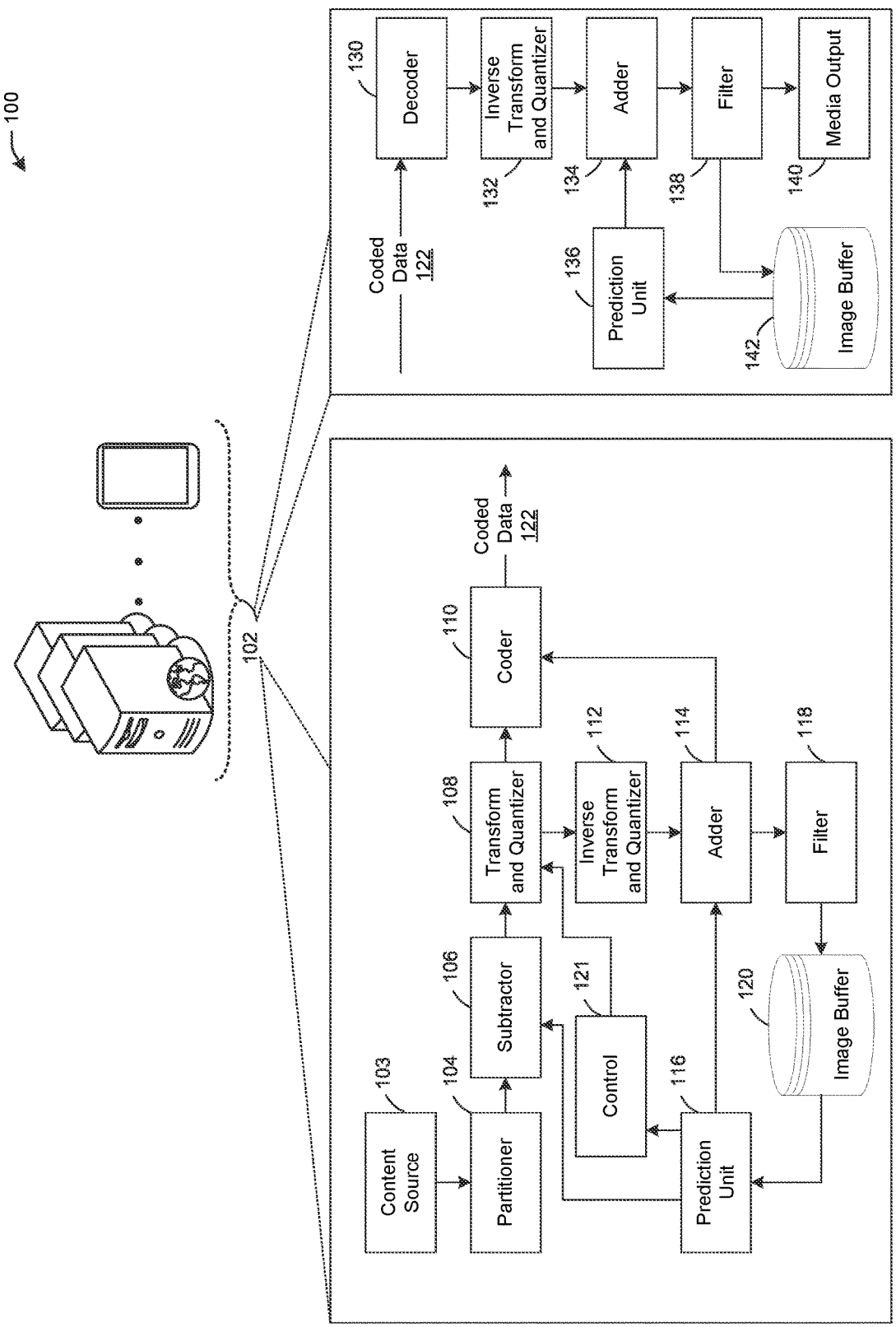
FIG. 1 depicts an example system illustrating components of encoding and decoding devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

To reduce the power/energy consumption and time of a video transcoding session, service providers employ various types of hardware (HW)-based encoders, which are generally more power-efficient and faster than software (SW) encoders. However, for every new video coding standard, such HW encoders are initially unable to achieve the video quality levels of SW encoders, and they take many years to mature enough to meet the video quality requirements of the targeted video applications. As a result, customers rely on central processing units (CPUs) during at least the first 10 years after the ratification of a video coding standard. For example, the AV1 standard was published back in 2018; however, it will likely take until 2023-2024 for AOMedia Video 1 (AV1) HW decoders, and until 2028-2030 for AV1 HW encoders, to be deployed as part of AV1-compliant products.

To address the above time gap, the concept of hybrid SW/HW encoding using video-HW-assisted CPUs is explained, which would help achieve the SW video-quality levels while also benefitting from the speed and power efficiency of HW encoding. Several examples (e.g., encoding non-reference pictures using a HW instance/module, while encoding reference pictures using the SW encoder on CPU cores) are described. However, the expected density and power-efficiency gains could be limited in some cases, and the implementation complexity might be too large for the achieved gains in other cases. Perhaps the highest benefit from hybrid SW/HW encoding would arise in video on demand (VOD) applications, where shots or segments of a long video sequence (e.g., movie, user-generated movie) would be encoded at different resolutions and different bit rates, i.e., multiple encodes per shot would be required. In such a use case, it is possible to assign, for each shot, some of the encodes to one of multiple HW instances, and the remaining encodes to the SW encoder (using CPU cores).

In many of the recent video deployments, Convex Hull (CVH) encoding may be used to maintain a good quality of service when the network conditions vary rapidly during the same streaming session. The service adapts to the user's bandwidth levels by streaming videos at different rate levels. The CVH algorithm outputs the (rate, distortion) pairs that achieve the largest (distortion reduction)/(rate increase) slopes for the target rate levels. Single-pass and two-pass CVH-optimized encoding solutions were described in two other disclosures. In single-pass CVH-optimized encoding, all video shots are encoded for all resolutions/quantization parameter (QP) combinations, and this can be computationally demanding. To address the potentially huge computational burden, two-pass CVH-optimized encoding could be employed, where a fast first-pass encoder is used to perform all (resolution, QP) encodings, with the resulting (rate, distortion) values to be used by the CVH algorithm to select the best (rate, distortion) pairs and corresponding (resolution, QP) values, and then a slower (higher-quality) second-pass encoder is used to encode the same shots for only the CVH-selected (resolution, QP) pairs.

Regardless of the convex-hull framework, hybrid SW/HW encoding can be employed, where any given task could be completed using the HW encoder on the HW instance or using the SW encoder on the CPU cores. The problem, however, is to decide which task goes to the HW encoder and which task goes to the SW encoder.

In one or more embodiments, a bit-rate-based hybrid encoding system may provide a solution that would yield the best-possible tradeoffs between video quality and wall time, the key metric measuring the energy (or equivalently, the dollar cost) would take a hybrid SW/HW encoding session to be completed on a given video-HW-assisted CPU.

Many streaming service providers employ hybrid SW/HW solutions, where the HW encoder resides on a separate card (i.e., discrete accelerator), which is connected to a CPU-based platform. They can reduce energy consumption and maximize density, but they are often not able to meet the quality or bandwidth requirements of many applications.

Another hybrid SW/HW solution could address the problem by encoding the non-important video content using the HW encoder and the important parts using the SW encoder. The main disadvantage of discrete-accelerator-based solutions is that they do not have a mechanism to decide whether to use the HW card or the CPU server to encode the video. In other words, for a given application, they achieve either high density through the HW encoder, but often with a non-controlled loss in video quality, or high quality through the SW encoder, but usually with a large loss in wall time (or density). Moreover, for a hybrid SW/HW solution, the expected density and energy-efficiency gains could be limited in some cases, and the implementation complexity might be too large for the achieved gains in other cases. There does not appear to be a simple solution that would allow users to utilize the HW/SW resources fully to achieve the best-possible tradeoffs between video quality and wall time.

Example embodiments of the present disclosure relate to systems, methods, and devices for Bit-Rate-Based Hybrid SW/HW Encoding on Video-HW-Assisted CPUs.

In one embodiment, a bit-rate-based hybrid encoding system may employ an estimated bit rate of a video shot to decide whether it should be assigned to the SW encoder or the HW encoder. The SW encoder is needed to achieve high video quality levels, and it can achieve great tradeoffs between video quality and a total number of cycles at low bit rates. On the other hand, the HW encoder can handle well high-bit-rate encoding, where non-supported advanced prediction features/tools would not be needed anyway.

To illustrate the solutions and embodiments described in this disclosure, by way of an example, consider a CVH-optimized encoder. Whether in single-pass or multiple-pass encoding, each video shot is assigned to either the HW encoder or the SW encoder. If the bit rate could be explicitly estimated (e.g., via a previous-pass encoder), the shot is assigned to the HW/SW encoder if the estimated bit rate is larger/lower (respectively) than the bit-rate threshold value. Otherwise, the shot is assigned to the HW/SW encoder if the estimated number-of-cycles of the corresponding (resolution, QP) pair is larger/lower (respectively) than the number-of-cycles threshold value. In single-pass CVH, each value of the number-of-cycles threshold used to separate the two high/low number-of-cycles ranges yields a different tradeoff between video quality and wall time. In two-pass CVH, each pair of values, corresponding to the number-of-cycles threshold (first pass) and the bit rate threshold (second pass), also yields a different tradeoff between video quality and wall time. Such threshold values are determined offline using a very large video test set, which contains video clips that are representative of each major target video application.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an example system 100 illustrating components of encoding and decoding devices, according to some example embodiments of the present disclosure.

Referring to FIG. 1, the system 100 may include devices 102 having encoder and/or decoder components. As shown, the devices 102 may include a content source 103 that provides video and/or audio content (e.g., a camera or other image capture device, stored images/video, etc.). The content source 103 may provide media (e.g., video and/or audio) to a partitioner 104, which may prepare frames of the content for encoding. A subtractor 106 may generate a residual as explained further herein. A transform and quantizer 108 may generate and quantize transform units to facilitate encoding by a coder 110 (e.g., entropy coder). Transform and quantized data may be inversely transformed and inversely quantized by an inverse transform and quantizer 112. An adder 114 may compare the inversely transformed and inversely quantized data to a prediction block generated by a prediction unit 116, resulting in reconstructed frames. A filter 118 (e.g., in-loop filter for resizing/cropping, color conversion, de-interlacing, composition/blending, etc.) may revise the reconstructed frames from the adder 114, and may store the reconstructed frames in an image buffer 120 for use by the prediction unit 116. A control 121 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 116. Using the encoding aspects, the transform and quantizer 108 may generate and quantize transform units to facilitate encoding by the coder 110, which may generate coded data 122 that may be transmitted (e.g., an encoded bitstream).

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 500 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1

(AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer 108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

The system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bitstream to reconstruct a predicted block. The prediction unit 136 may set the correct prediction mode for each block, where the prediction mode may be extracted and decompressed from the compressed bitstream.

In one or more embodiments, the coded data 122 may include both video and audio data. In this manner, the system 100 may encode and decode both audio and video.

It is understood that the above descriptions are for purposes of illustration and are not meant to be limiting.

Figure 2:
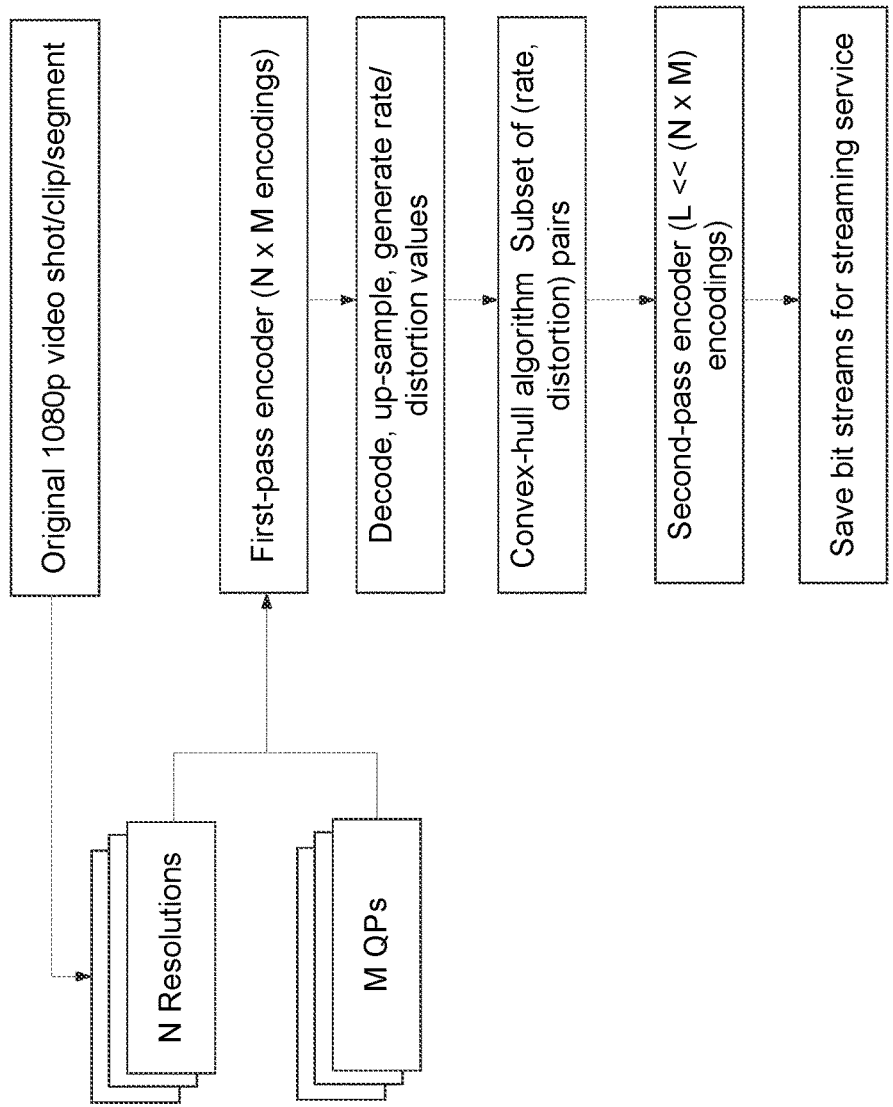
FIG. 2 depicts an illustrative schematic diagram for bit-rate-based hybrid encoding, in accordance with one or more example embodiments of the present disclosure.

FIG. 2 depicts an illustrative schematic diagram for bit-rate-based hybrid encoding, in accordance with one or more example embodiments of the present disclosure.

Referring to FIG. 2, there is shown an example of a SW-only 2-pass convex-hull (CVH)-optimized encoder. It should be understood that although a 2-pass CVH encoder is shown in the example of FIG. 2, this is only for illustration purposes and that this is may be possible for other types of encoders (single or multiple pass encoders).

The concept of the CVH makes a choice between picking resolution and bit rates that lowers the processing cost of encoding/decoding. For example, assuming the possible encode is for resolution 1080p but at a low bit rate, the resulting encoding will result in a blocky or pixelated video because it is a large file having a large number of pixels. Since in this example, the bit rate is low, it may be more beneficial to lower the resolution (e.g., 720p), which would not need as much bit rate to encode/decode. This would make the quality of the video shot look better. Therefore, the CVH would select the 720p vs the 1080p for streaming.

A video stream may be received from a source before being sent or downloaded by a client device. This video stream may be in the form of a video shot. The video shot may then be downsampled into multiple smaller resolutions (say N resolutions, where N is a positive integer) in order to provide encoding in these various resolutions before being delivered to the client's device. For example, for a video shot, there may be a 1080p version, a 720p version, or another version. For each of these specific-resolution videos is then encoded by a SW first-pass encoder at multiple constant rate factors (CRFs) (also referred to as QPs). For example, each of these specific-resolution videos may be encoded for M QP values, covering the full QP range, where M is a positive integer. Next, all encoded bit streams may be decoded, and all corresponding (rate, distortion) values are produced (N*M encodings/points). The distortion is a result value of a comparison between the original resolution (e.g., 1080p) of the video shot and an upsampled version (e.g., to bring it to 1080p) of the video shot that has been encoded in a lower resolution (e.g., a 720p). The (rate, distortion) values are then input to the CVH algorithm, which would keep only the pairs/points that yield good rate-distortion tradeoffs at the target rate levels. Therefore, a subset of the (rate, distortion) pairs would be used. A second-pass SW encoder may be used to re-encode the same video shot for only the CVH-selected (resolution, QP) pairs and produce the final bitstreams. These final bitstreams at various encodings would then be available for a client device to download. The selection of one encoding versus another depends on the network condition and the client device capability.

Figure 3:
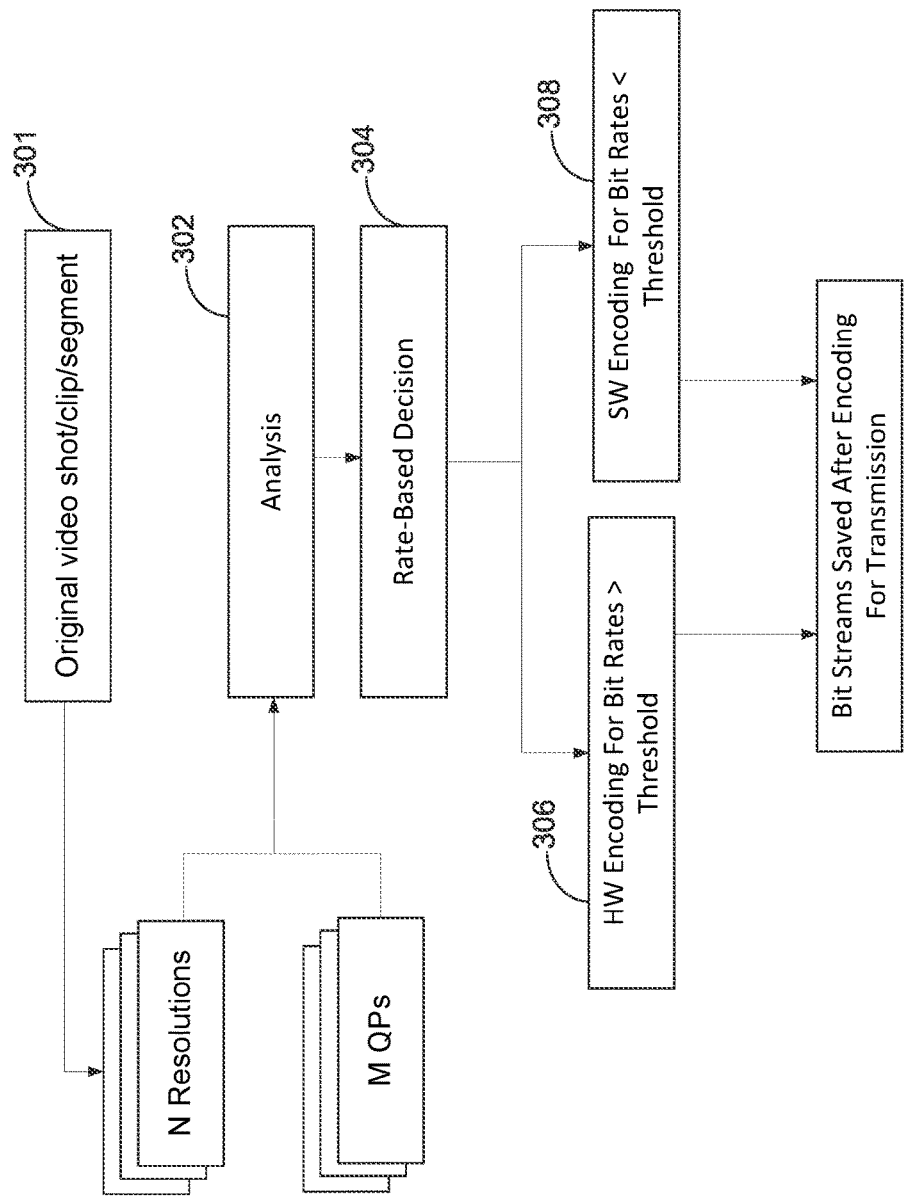
FIG. 3 depicts an illustrative schematic diagram for bit-rate-based hybrid encoding, in accordance with one or more example embodiments of the present disclosure.

FIG. 3 depicts an illustrative schematic diagram for bit-rate-based hybrid encoding, in accordance with one or more example embodiments of the present disclosure.

When a user is interested in downloading a video, the user may have certain requirements for the resolution. The issue is when a service streams video content, the network condition may dictate the resolution.

In one or more embodiments, a bit-rate-based hybrid encoding system may decide to switch between a hardware encoder and a software encoder based on criteria. The hardware encoder is typically cheaper in the sense it takes fewer cycles to perform an encoding/decoding task. However, the hardware encoder may not result in as good of a quality as a software encoder. A software encoder can take advantage of multiple products and tools to perform its function. The switching between the hardware and software encoders is done based on minimizing the wall time. The wall time is how long a chip is powered to process a certain number of videos. The wall time indicates how fast can an encoding job finish encoding/decoding one or more videos. The more a computer chip is powered on in order to process a number of videos, the more costly it is power-wise. The higher the wall time, the more costly the process is. Therefore, an improved wall time is a key benefit of the bit-rate-based hybrid encoding system.

In one or more embodiments, a bit-rate-based hybrid encoding system may be applicable to single or multiple-pass encoders. As an illustration of the bit-rate-based hybrid encoding system, the example of FIG. 3 shows a 2-pass encoder, where the bit-rate-based hybrid encoding system is implemented. The 2-pass encoder is a more general example, where software or hardware encoders can be used at all stages of encoding. It should be understood that this example would also apply to single or multiple pass encoding.

In one or more embodiments, using a 2-pass encoder as an example is used to save CPU cycles and reduce the wall time of the transcoding session. In this example, an analysis 302 is performed on video content 301 to determine the estimated bit rate and the distortion values from the original video content 301. During analysis 302, a first-pass SW encoder could be replaced by a HW encoder for some or all the encodings of the video content 301, depending on the estimated number of cycles of the corresponding (resolution, QP) pair.

After the first pass encoder encodes the various encoding (M×N), a smaller subset of encodes may be utilized in a second pass encoder. A rate-based decision 304 is performed to determine whether to use a HW or SW encoder as a second-pass encoder. For a high resolution and/or a low QP value, the bit rate is expected to be high (on average), and the number of cycles is also expected to be high (on average). For a low resolution and/or a high QP value, the bit rate is expected to be low (on average), and the number of cycles is also expected to be low (on average).

The HW encoder could then be applied to the highest-cycles-consuming encodes, leaving the lowest-cycles-consuming encodes to the SW encoder. Each number-of-cycles threshold value would yield a different tradeoff between video quality and wall time. For example, it may be found that, for the fastest-encoding speed settings (high bit rates), it is better to assign the 1080p-resolution shots to the HW encoder, while assigning the remaining shots to the SW encoder.

Moreover, the HW encoder could be used in the second-pass stage to perform some or all of the encodings, depending on the first pass estimated bit rate. For a high bit rate, the number of cycles is expected to be high (on average), and for a low bit rate, the number of cycles is expected to be low (on average). Here again, the HW encoder could be applied to the highest-cycles-consuming encodes, leaving the lowest-cycles-consuming encodes to the SW encoder. Each bit rate threshold value would then yield a different tradeoff between video quality and wall time.

An example would be to assign all encodings with an estimated bit rate greater than a bit rate threshold (e.g., 5 Mbps, or any other value) to the HW encoder, and all encodings with an estimated bit rate below a threshold (e.g., 5 Mbps, or any other value) to the SW encoder. This is shown in blocks 306 and 308 of FIG. 3. This comparison to a predetermined threshold may be done before a first pass encoder or a second pass encoder.

In one or more embodiments, a bit-rate-based hybrid encoding system may develop tradeoffs between video quality and wall time to test all combinations of M bit rate threshold values (e.g., 500 Kbps, 1 Mbps, 3 Mbps, 5 Mbps, and 10 Mbps) and N number-of-cycles threshold values, dividing resolutions (e.g., 1080p, 720p, 480p and <=360p), and then apply the CVH algorithm to the (N×M) (rate, distortion) pairs to develop the best (rate, distortion) pairs, or equivalently, the best pairs of threshold values. After the decision is made to use a HW encoder or a SW encoder based on comparing the estimated bit rate to the predetermined threshold, a bit-rate-based hybrid encoding system may then perform the encoding with the respective encoder in order to generate bit streams that would be saved and ready to be downloaded to a client's device.

It is understood that the above descriptions are for purposes of illustration and are not meant to be limiting.

Figure 4:
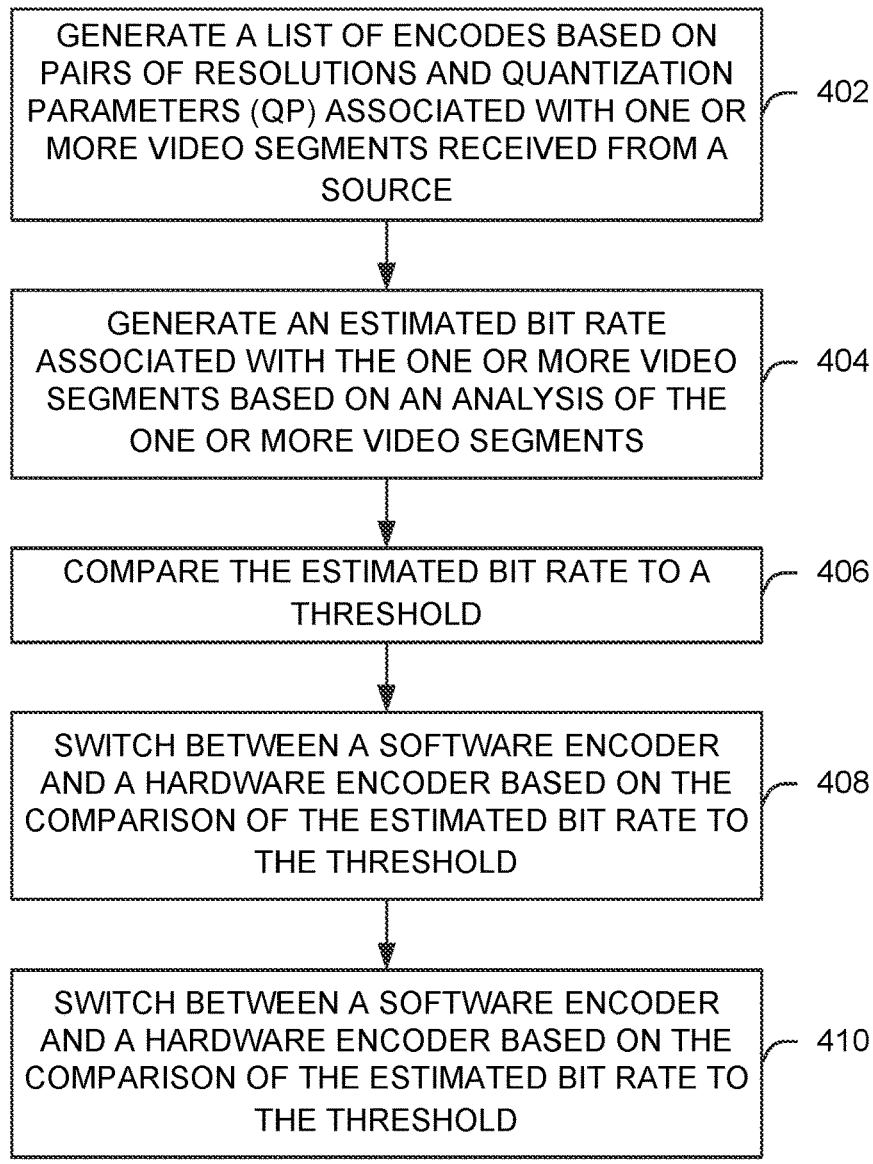
FIG. 4 illustrates a flow diagram of a process for an illustrative bit-rate-based hybrid encoding system, in accordance with one or more example embodiments of the present disclosure.

FIG. 4 illustrates a flow diagram of a process 400 for a bit-rate-based hybrid encoding system, in accordance with one or more example embodiments of the present disclosure.

At block 402, a device (e.g., the bit-rate-based hybrid encoding device 519 of FIG. 5) may generate a list of encodes based on pairs of resolutions and quantization parameters (QP) associated with one or more video segments received from a source.

At block 404, the device may generate an estimated bit rate associated with the one or more video segments based on an analysis of the one or more video segments.

At block 406, the device may compare the estimated bit rate to a threshold.

At block 408, the device may switch between a software encoder and a hardware encoder based on the comparison of the estimated bit rate to the threshold.

At block 410, the device may encode each of the one or more video segments for transmission using the hardware encoder or the software encoder.

It is understood that the above descriptions are for purposes of illustration and are not meant to be limiting.

Figure 5:
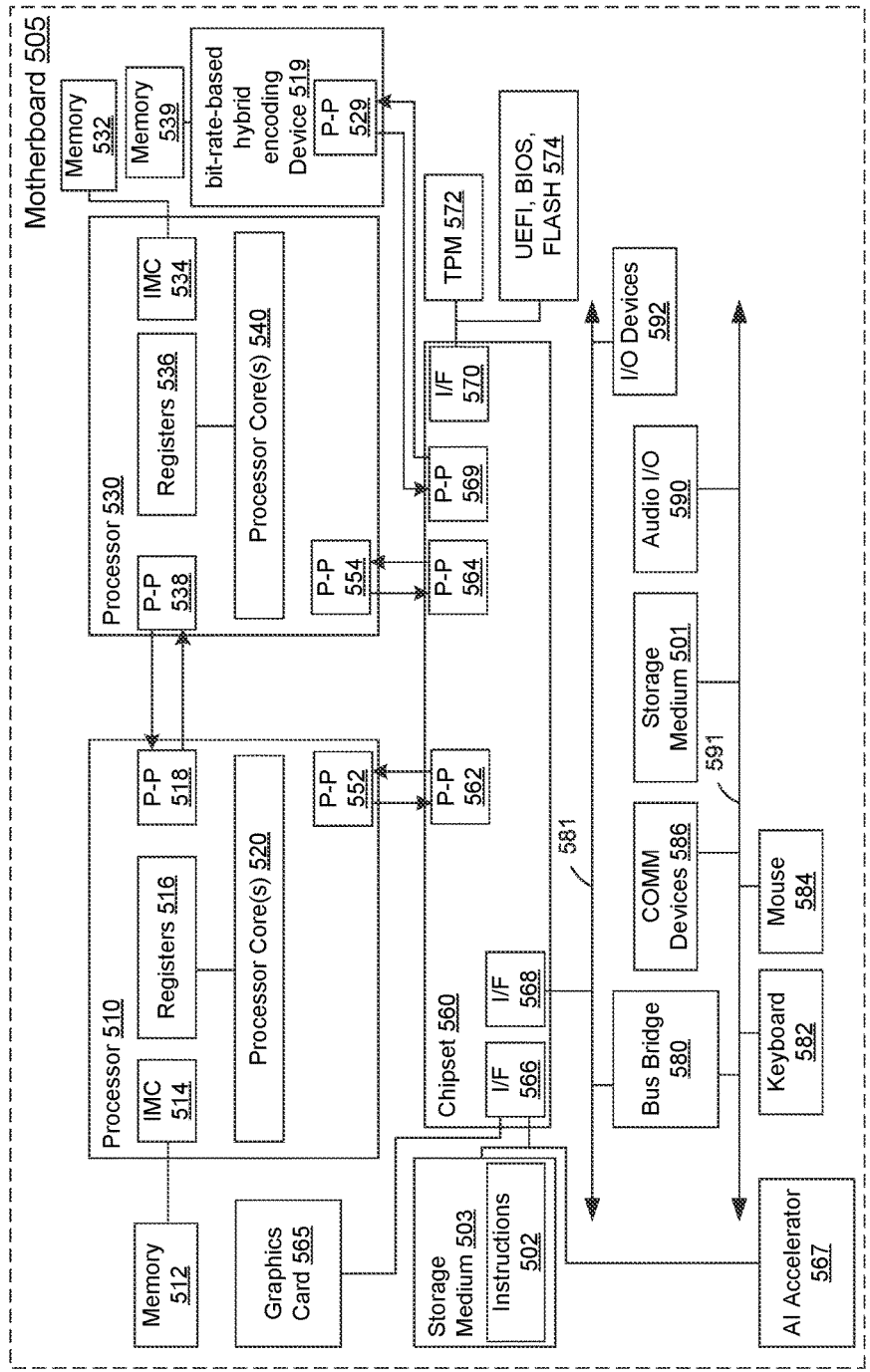
FIG. 5 is a block diagram illustrating an example of a computing device or computing system upon which any of one or more techniques (e.g., methods) may be performed, in accordance with one or more example embodiments of the present disclosure.

FIG. 5 illustrates an embodiment of an exemplary system 500, in accordance with one or more example embodiments of the present disclosure.

In various embodiments, the computing system 500 may comprise or be implemented as part of an electronic device.

In some embodiments, the computing system 500 may be representative, for example, of a computer system that implements one or more components of FIG. 1.

The embodiments are not limited in this context. More generally, the computing system 500 is configured to implement all logic, systems, processes, logic flows, methods, equations, apparatuses, and functionality described herein.

The system 500 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 500 may have a single processor with one core or more than one processor. Note that the term "processor" refers to a processor with a single core or a processor package with multiple processor cores.

In at least one embodiment, the computing system 500 is representative of one or more components of FIG. 1. More generally, the computing system 500 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 500. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 500 comprises a motherboard 505 for mounting platform components. The motherboard 505 is a point-to-point interconnect platform that includes a processor 510, a processor 530 coupled via a point-to-point interconnects as an Ultra Path Interconnect (UPI), and a bit-rate-based hybrid encoding device 519. In other embodiments, the system 500 may be of another bus architecture, such as a multi-drop bus. Furthermore, each of processors 510 and 530 may be processor packages with multiple processor cores. As an example, processors 510 and 530 are shown to include processor core(s) 520 and 540, respectively. While the system 500 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 510 and the chipset 560. Some platforms may include additional components and some platforms may only include sockets to mount the processors and/or the chipset.

The processors 510 and 530 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 510, and 530.

The processor 510 includes an integrated memory controller (IMC) 514, registers 516, and point-to-point (P-P) interfaces 518 and 552. Similarly, the processor 530 includes an IMC 534, registers 536, and P-P interfaces 538 and 554. The IMC's 514 and 534 couple the processors 510 and 530, respectively, to respective memories, a memory 512 and a memory 532. The memories 512 and 532 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 512 and 532 locally attach to the respective processors 510 and 530.

In addition to the processors 510 and 530, the system 500 may include a bit-rate-based hybrid encoding device 519. The bit-rate-based hybrid encoding device 519 may be connected to chipset 560 by means of P-P interfaces 529 and 569. The bit-rate-based hybrid encoding device 519 may also be connected to a memory 539. In some embodiments, the bit-rate-based hybrid encoding device 519 may be connected to at least one of the processors 510 and 530. In other embodiments, the memories 512, 532, and 539 may couple with the processor 510 and 530, and the bit-rate-based hybrid encoding device 519 via a bus and shared memory hub.

System 500 includes chipset 560 coupled to processors 510 and 530. Furthermore, chipset 560 can be coupled to storage medium 503, for example, via an interface (I/F) 566. The I/F 566 may be, for example, a Peripheral Component Interconnect-enhanced (PCI-e). The processors 510, 530, and the bit-rate-based hybrid encoding device 519 may access the storage medium 503 through chipset 560.

Storage medium 503 may comprise any non-transitory computer-readable storage medium or machine-readable storage medium, such as an optical, magnetic or semiconductor storage medium. In various embodiments, storage medium 503 may comprise an article of manufacture. In some embodiments, storage medium 503 may store computer-executable instructions, such as computer-executable instructions 502 to implement one or more of processes or operations described herein, (e.g., process 400 of FIG. 4). The storage medium 503 may store computer-executable instructions for any equations depicted above. The storage medium 503 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 510 couples to a chipset 560 via P-P interfaces 552 and 562 and the processor 530 couples to a chipset 560 via P-P interfaces 554 and 564. Direct Media Interfaces (DMIs) may couple the P-P interfaces 552 and 562 and the P-P interfaces 554 and 564, respectively. The DMI may be a high-speed interconnect that facilitates, e.g., eight Giga Transfers per second (GT/s) such as DMI 3.0. In other embodiments, the processors 510 and 530 may interconnect via a bus.

The chipset 560 may comprise a controller hub such as a platform controller hub (PCH). The chipset 560 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 560 may comprise more than one controller hub such as a chipset with a memory controller hub, a graphics controller hub, and an input/output (I/O) controller hub.

In the present embodiment, the chipset 560 couples with a trusted platform module (TPM) 572 and the UEFI, BIOS, Flash component 574 via an interface (I/F) 570. The TPM 572 is a dedicated microcontroller designed to secure hardware by integrating cryptographic keys into devices. The UEFI, BIOS, Flash component 574 may provide pre-boot code.

Furthermore, chipset 560 includes the I/F 566 to couple chipset 560 with a high-performance graphics engine, graphics card 565. In other embodiments, the system 500 may include a flexible display interface (FDI) between the processors 510 and 530 and the chipset 560. The FDI interconnects a graphics processor core in a processor with the chipset 560.

Various I/O devices 592 couple to the bus 581, along with a bus bridge 580 which couples the bus 581 to a second bus 591 and an I/F 568 that connects the bus 581 with the chipset 560. In one embodiment, the second bus 591 may be a low pin count (LPC) bus. Various devices may couple to the second bus 591 including, for example, a keyboard 582, a mouse 584, communication devices 586, a storage medium 501, and an audio I/O 590.

The artificial intelligence (AI) accelerator 567 may be circuitry arranged to perform computations related to AI. The AI accelerator 567 may be connected to storage medium 503 and chipset 560. The AI accelerator 567 may deliver the processing power and energy efficiency needed to enable abundant-data computing. The AI accelerator 567 is a class of specialized hardware accelerators or computer systems designed to accelerate artificial intelligence and machine learning applications, including artificial neural networks and machine vision. The AI accelerator 567 may be applicable to algorithms for robotics, internet of things, other data-intensive and/or sensor-driven tasks.

Many of the I/O devices 592, communication devices 586, and the storage medium 501 may reside on the motherboard 505 while the keyboard 582 and the mouse 584 may be add-on peripherals. In other embodiments, some or all the I/O devices 592, communication devices 586, and the storage medium 501 are add-on peripherals and do not reside on the motherboard 505.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following examples pertain to further embodiments.

Example 1 may include a device comprising processing circuitry coupled to storage, the processing circuitry configured to: generate a list of encodes based on pairs of resolution and quantization parameters (QP) pairs associated with one or more video segments received from a source; generate an estimated bit rate associated with the one or more video segments based on an analysis of the one or more video segments; compare the estimated bit rate to a threshold; switch between a software encoder and a hardware encoder based on the comparison of the estimated bit rate to the threshold; and encode each of the one or more video segments for transmission using the hardware encoder or the software encoder.

Example 2 may include the device of example 1 and/or some other example herein, wherein the threshold may be selected based criteria that minimizes a wall time associated with encoding a pre-determined number of videos.

Example 3 may include the device of example 1 and/or some other example herein, wherein the processing circuitry may be further configured to perform first pass encoding using the hardware encoder or the software encoder when encoding the one or more video segments.

Example 4 may include the device of example 1 and/or some other example herein, wherein the processing circuitry may be further configured to: determine that the estimated bit rate may be greater than the threshold; and utilize the hardware encoder.

Example 5 may include the device of example 1 and/or some other example herein, wherein the processing circuitry may be further configured to: determine that the estimated bit rate may be less than the threshold; and utilize the software encoder.

Example 6 may include the device of example 1 and/or some other example herein, wherein the processing circuitry may be further configured to utilize the hardware encoder with a subset of highest-cycle-consuming encodes.

Example 7 may include the device of example 1 and/or some other example herein, wherein the processing circuitry may be further configured to utilize the software encoder with a subset of lowest-cycle-consuming encodes.

Example 8 may include the device of example 1 and/or some other example herein, wherein the estimated bit rate decreases with decreasing resolutions and increasing QPs of the one or more video segments.

Example 9 may include the device of example 1 and/or some other example herein, wherein the threshold may be selected based on a tradeoff between video quality and wall time associated with the one or more video segments.

Example 10 may include a non-transitory computer-readable medium storing computer-executable instructions which when executed by one or more processors result in performing operations comprising: generating a list of encodes based on pairs of resolution and quantization parameters (QP) pairs associated with one or more video segments received from a source; generating an estimated bit rate associated with the one or more video segments based on an analysis of the one or more video segments; comparing the estimated bit rate to a threshold; switch between a software encoder and a hardware encoder based on the comparison of the estimated bit rate to the threshold; and encoding each of the one or more video segments for transmission using the hardware encoder or the software encoder.

Example 11 may include the non-transitory computer-readable medium of example 10 and/or some other example herein, wherein the threshold may be selected based criteria that minimizes a wall time associated with encoding a pre-determined number of videos.

Example 12 may include the non-transitory computer-readable medium of example 10 and/or some other example herein, wherein the operations further comprise performing first pass encoding using the hardware encoder or the software encoder when encoding the one or more video segments.

Example 13 may include the non-transitory computer-readable medium of example 10 and/or some other example herein, wherein the operations further comprise: determining that the estimated bit rate may be greater than the threshold; and utilizing the hardware encoder.

Example 14 may include the non-transitory computer-readable medium of example 10 and/or some other example herein, wherein the operations further comprise: determining that the estimated bit rate may be less than the threshold; and utilizing the software encoder.

Example 15 may include the non-transitory computer-readable medium of example 10 and/or some other example herein, wherein the operations further comprise utilizing the hardware encoder with a subset of highest-cycle-consuming encodes.

Example 16 may include the non-transitory computer-readable medium of example 10 and/or some other example herein, wherein the operations further comprise utilizing the software encoder with a subset of lowest-cycle-consuming encodes.

Example 17 may include the non-transitory computer-readable medium of example 10 and/or some other example herein, wherein the estimated bit rate decreases with decreasing resolutions and increasing QPs of the one or more video segments.

Example 18 may include the non-transitory computer-readable medium of example 10 and/or some other example herein, wherein the threshold may be selected based on a tradeoff between video quality and wall time associated with the one or more video segments.

Example 19 may include a method comprising: generating, by one or more processors, a list of encodes based on pairs of resolution and quantization parameters (QP) pairs associated with one or more video segments received from a source; generating an estimated bit rate associated with the one or more video segments based on an analysis of the one or more video segments; comparing the estimated bit rate to a threshold; switch between a software encoder and a hardware encoder based on the comparison of the estimated bit rate to the threshold; and encoding each of the one or more video segments for transmission using the hardware encoder or the software encoder.

Example 20 may include the method of example 19 and/or some other example herein, wherein the threshold may be selected based criteria that minimizes a wall time associated with encoding a pre-determined number of videos.

Example 21 may include the method of example 19 and/or some other example herein, further comprising performing first pass encoding using the hardware encoder or the software encoder when encoding the one or more video segments.

Example 22 may include the method of example 19 and/or some other example herein, further comprising: determining that the estimated bit rate may be greater than the threshold; and utilizing the hardware encoder.

Example 23 may include the method of example 19 and/or some other example herein, further comprising: determining that the estimated bit rate may be less than the threshold; and utilizing the software encoder.

Example 24 may include the method of example 19 and/or some other example herein, further comprising utilizing the hardware encoder with a subset of highest-cycle-consuming encodes.

Example 25 may include the method of example 19 and/or some other example herein, further comprising utilizing the software encoder with a subset of lowest-cycle-consuming encodes.

Example 26 may include the method of example 19 and/or some other example herein, wherein the estimated bit rate decreases with decreasing resolutions and increasing QPs of the one or more video segments.

Example 27 may include the method of example 19 and/or some other example herein, wherein the threshold may be selected based on a tradeoff between video quality and wall time associated with the one or more video segments.

Example 28 may include an apparatus comprising means for: generating a list of encodes based on pairs of resolution and quantization parameters (QP) pairs associated with one or more video segments received from a source; generating an estimated bit rate associated with the one or more video segments based on an analysis of the one or more video segments; comparing the estimated bit rate to a threshold; switch between a software encoder and a hardware encoder based on the comparison of the estimated bit rate to the threshold; and encoding each of the one or more video segments for transmission using the hardware encoder or the software encoder.

Example 29 may include the apparatus of example 28 and/or some other example herein, wherein the threshold may be selected based criteria that minimizes a wall time associated with encoding a pre-determined number of videos.

Example 30 may include the apparatus of example 28 and/or some other example herein, further comprising performing first pass encoding using the hardware encoder or the software encoder when encoding the one or more video segments.

Example 31 may include the apparatus of example 28 and/or some other example herein, further comprising: determining that the estimated bit rate may be greater than the threshold; and utilizing the hardware encoder.

Example 32 may include the apparatus of example 28 and/or some other example herein, further comprising: determining that the estimated bit rate may be less than the threshold; and utilizing the software encoder.

Example 33 may include the apparatus of example 28 and/or some other example herein, further comprising utilizing the hardware encoder with a subset of highest-cycle-consuming encodes.

Example 34 may include the apparatus of example 28 and/or some other example herein, further comprising utilizing the software encoder with a subset of lowest-cycle-consuming encodes.

Example 35 may include the apparatus of example 28 and/or some other example herein, wherein the estimated bit rate decreases with decreasing resolutions and increasing QPs of the one or more video segments.

Example 36 may include the apparatus of example 28 and/or some other example herein, wherein the threshold may be selected based on a tradeoff between video quality and wall time associated with the one or more video segments.

Example 37 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 38 may include an apparatus comprising logic, modules, and/or circuitry to perform one or more elements of a method described in or related to any of examples 1-36, or any other method or process described herein.

Example 39 may include a method, technique, or process as described in or related to any of examples 1-36, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-36, or portions thereof.

Example 41 may include a method of communicating in a wireless network as shown and described herein.

Example 42 may include a system for providing wireless communication as shown and described herein.

Example 43 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   generate a list of encodes based on pairs of resolution and quantization parameters (QP) pairs associated with one or more video segments received from a source;
   generate an estimated bit rate associated with the one or more video segments based on an analysis of the one or more video segments;
   compare the estimated bit rate to a threshold;
   switch between a software encoder and a hardware encoder based on the comparison of the estimated bit rate to the threshold; and
   encode each of the one or more video segments for transmission using the hardware encoder or the software encoder.

2. The device of claim 1, wherein the threshold is selected based criteria that minimizes a wall time associated with encoding a pre-determined number of videos.

3. The device of claim 1, wherein the processing circuitry is further configured to perform first pass encoding using the hardware encoder or the software encoder when encoding the one or more video segments.

4. The device of claim 1, wherein the processing circuitry is further configured to:
   determine that the estimated bit rate is greater than the threshold; and
   utilize the hardware encoder.

5. The device of claim 1, wherein the processing circuitry is further configured to:
   determine that the estimated bit rate is less than the threshold; and
   utilize the software encoder.

6. The device of claim 1, wherein the processing circuitry is further configured to utilize the hardware encoder with a subset of highest-cycle-consuming encodes.

7. The device of claim 1, wherein the processing circuitry is further configured to utilize the software encoder with a subset of lowest-cycle-consuming encodes.

8. The device of claim 1, wherein the estimated bit rate decreases with decreasing resolutions and increasing QPs of the one or more video segments.

9. The device of claim 1, wherein the threshold is selected based on a tradeoff between video quality and wall time associated with the one or more video segments.

10. A non-transitory computer-readable medium storing computer-executable instructions which when executed by one or more processors result in performing operations comprising:

generating a list of encodes based on pairs of resolution and quantization parameters (QP) pairs associated with one or more video segments received from a source;

generating an estimated bit rate associated with the one or more video segments based on an analysis of the one or more video segments;

comparing the estimated bit rate to a threshold;

switch between a software encoder and a hardware encoder based on the comparison of the estimated bit rate to the threshold; and encoding each of the one or more video segments for transmission using the hardware encoder or the software encoder.

11. The non-transitory computer-readable medium of claim 10, wherein the threshold is selected based criteria that minimizes a wall time associated with encoding a pre-determined number of videos.

12. The non-transitory computer-readable medium of claim 10, wherein the operations further comprise performing first pass encoding using the hardware encoder or the software encoder when encoding the one or more video segments.

13. The non-transitory computer-readable medium of claim 10, wherein the operations further comprise:

determining that the estimated bit rate is greater than the threshold; and utilizing the hardware encoder.

14. The non-transitory computer-readable medium of claim 10, wherein the operations further comprise:

determining that the estimated bit rate is less than the threshold; and utilizing the software encoder.

15. The non-transitory computer-readable medium of claim 10, wherein the operations further comprise utilizing the hardware encoder with a subset of highest-cycle-consuming encodes.

16. The non-transitory computer-readable medium of claim 10, wherein the operations further comprise utilizing the software encoder with a subset of lowest-cycle-consuming encodes.

17. The non-transitory computer-readable medium of claim 10, wherein the estimated bit rate decreases with decreasing resolutions and increasing QPs of the one or more video segments.

18. The non-transitory computer-readable medium of claim 10, wherein the threshold is selected based on a tradeoff between video quality and wall time associated with the one or more video segments.

19. A method comprising:

generating, by one or more processors, a list of encodes based on pairs of resolution and quantization parameters (QP) pairs associated with one or more video segments received from a source;

generating an estimated bit rate associated with the one or more video segments based on an analysis of the one or more video segments;

comparing the estimated bit rate to a threshold;

switch between a software encoder and a hardware encoder based on the comparison of the estimated bit rate to the threshold; and encoding each of the one or more video segments for transmission using the hardware encoder or the software encoder.

20. The method of claim 19, wherein the threshold is selected based criteria that minimizes a wall time associated with encoding a pre-determined number of videos.

* * * * *